United States Patent [19]

Hata et al.

[11] 4,404,337

[45] Sep. 13, 1983

[54] PROCESS FOR INHIBITING THE FORMATION OF SCALE IN THE SUSPENSION POLYMERIZATION OF VINYL CHLORIDE

[75] Inventors: Akio Hata; Michifumi Tanga, both of Shinnan'yo, Japan

[73] Assignee: Tokuyama Sekisui Kogyo Kabushiki Kaisha, Osaka, Japan

[21] Appl. No.: 274,663

[22] Filed: Jun. 17, 1981

[30] Foreign Application Priority Data

Jun. 17, 1980 [JP] Japan ............................ 55-82240

[51] Int. Cl.³ .......................... C08F 14/06; C08F 2/20
[52] U.S. Cl. ...................................... 526/62; 526/74
[58] Field of Search .................................. 526/62, 74

[56] References Cited

U.S. PATENT DOCUMENTS

| 4,093,787 | 6/1978 | Burgess | 526/62 |
| 4,220,743 | 9/1980 | Englin | 526/62 |
| 4,256,863 | 3/1981 | McOnie | 526/62 |

FOREIGN PATENT DOCUMENTS

| 45-30343 | 10/1970 | Japan . | |
| 55-48010 | 10/1980 | Japan | 526/62 |
| 55-133410 | 10/1980 | Japan | 526/62 |

*Primary Examiner*—C. A. Henderson
*Attorney, Agent, or Firm*—Armstrong, Nikaido, Marmelstein & Kubovcik

[57] ABSTRACT

The formation of scale on the inner surfaces of a vessel used for suspension polymerizing vinyl chloride is inhibited by applying a ternary reaction product of furfural, a polyamine and a phenol to said inner surfaces or by adding the ternary product to the polymerization system.

5 Claims, No Drawings

PROCESS FOR INHIBITING THE FORMATION OF SCALE IN THE SUSPENSION POLYMERIZATION OF VINYL CHLORIDE

BACKGROUND OF THE INVENTION

This invention relates to a process for suspension-polymerizing vinyl chloride. More particularly, the invention relates to a process for preventing polymer scale from adhering to the inner surface of a polymerization vessel in which vinyl chloride is suspension-polymerized, by adding beforehand a specific compound to the polymerization system or by applying the specific compound to the inner surface of the polymerization vessel.

On carrying out the suspension polymerization of vinyl chloride, a larger amount of polymer scale often adheres to the inner surface of the polymerization vessel. When the polymer scale adheres to the inner surface of the polymerization vessel, it causes not only the polymerization yield to be decreased, but also causes difficulty in controlling the temperature in the vessel. This is because the scale hinders conduction of heat on the surface of the vessel, and hence the polymerization reaction cannot be advanced as desired. Furthermore, it sometimes happens that the scale is peeled off from the inner surface of the vessel and mixed into the polymer which is to be the product. Thus, the quality of the product is deteriorated. Adhesion of the polymer scale brings about such disadvantages as stated above, and it is necessary to minimize the amount of scale adhering to the vessel when the polymerization is carried out.

Various attempts have been made to prevent the scale from adhering to the vessel. Most of the attempts adopt a method in which a specific compound is applied beforehand to the inner surface of the polymerization vessel. However, this method is not effective in preventing the scale from adhering when the compound is applied in a small amount. On the other hand, if too much of the compound is applied, the compound is often peeled from the surface of the vessel, and mixed in the polymer and deteriorates the quality of the product, or the compound dissolves in the liquid and acts as a polymerization inhibiting agent, thus making it difficult to carry out the polymerization smoothly. These disadvantages ought to be solved to some extent by improving the compound which is applied. However, it is difficult to obtain a compound which sticks firmly to the inner surface of the polymerization vessel and which maintains a lasting effect of preventing the scale from adhering.

The present applicants previously proposed applying in advance a reaction product of furfural and diamine to the inner surface of a polymerization vessel. Although this reaction product had an excellent effect in preventing the scale from adhering, it could not eliminate the disadvantages mentioned above.

It was also proposed to prevent the scale from adhering by adding beforehand a specific compound to the polymerization system. This proposal is, for example, disclosed in Japanese Patent Publication No. 45-30343. In this publication, many compounds are disclosed as being useful as the compound to be added. The compounds are roughly classified into the following groups: (a) compounds containing an azo-group, nitro-group, nitroso-group, azomethine group, or azine-ring, and nitrogen atom-containing organic compounds, such as amino-compounds, (b) sulfur atom-containing organic compounds having a thiocarbonyl-group, thioether-group or thioalcohol-group, (c) polar organic compounds, such as quinone compounds, ketone compounds, aldehyde compounds, alcohol compounds having more than 6 carbon atoms, and carbonic acid compounds having more than 6 carbon atoms. Although the compounds listed in the publication seem to cover a wide range of chemical substances, the compounds are, in fact, nothing but low molecular weight compounds. Moreover, the publication states that polar organic compounds are preferably used which form a mono-molecular film and further that it is desirable to add the polar organic compounds to a medium in the polymerization system and thus prevent the film from transferring to the medium. Judging from the statements relating to a mono-molecular film, it may be concluded that the publication contemplates nothing but the use of low molecular weight compounds.

The present inventors carried out polymerizations according to the teachings of Japanese Patent Publication No. 45-30343, and discovered that, in so far as the disclosed compounds were used as they were, the compounds did not bring about a sufficient effect in the prevention of scale adhesion, but sometimes caused disadvantages such as deteriorated particle size distribution of the resulting polymers, decreased polymerization rate, and coloring of the resulting polymer. Further, the inventors found that some of the compounds listed in the publication were scarcely effective in preventing the scale adhesion. Thus the inventors found that it was not possible to determine whether the compounds containing the specific groups were effective for preventing scale adhesion.

The inventors carried out further studies to find a more effective method for prevention of scale adhesion. As a result, the inventors have found that the adhesion of scale to a polymerization vessel in the suspension polymerization of vinyl chloride can be prevented when a reaction product of furfural, polyamine and phenol is applied to the inner surface of the polymerization vessel, or when the reaction product is added to the polymerization system. Moreover, the inventors have observed that the reaction product neither hinders the polymerization itself, nor deteriorates the final product by becoming mixed therewith.

SUMMARY OF THE INVENTION

The present invention provides a process for suspension polymerizing vinyl chloride which comprises applying a reaction product of furfural, polyamine and phenol to the inner surface of a polymerization vessel, or to the surface of annexes in the vessel prior to carrying out the polymerization. Alternatively, the process comprises adding the reaction product to a polymerization system in which vinyl chloride alone or a mixture of vinyl chloride and other monomers are dispersed in an aqueous medium and is polymerized in a suspension state in the presence of an oil-soluble polymerization initiating agent.

DETAILED DESCRIPTION

The present invention is characterized by the use of a reaction product of furfural, polyamine and phenol (hereinafter the reaction product is referred to simply as the ternary product).

As for the polyamines employed as a raw material for the ternary product, various amines can be employed.

Furthermore, various sequences are contemplated by which the ternary product is produced. Moreover, various methods are contemplated based on the variations that either an acid or an alkali are used as a catalyst for carrying out the reaction for forming the ternary product.

The polyamine suitable for use in this invention is roughly classified into three groups. These are aliphatic polyamines, alicyclic polyamines, and aromatic polyamines. Among them, as a suitable polyamine belonging to the group of aliphatic polyamines there may be mentioned, for example, ethylenediamine, propylenediamine, trimethylenediamine, tetramethylenediamine, pentamethylenediamine, hexamethylenediamine, diethylenetriamine, tetraethylenepentamine, polyethyleneimine, and so on. As a polyamine belonging to the group of alicyclic polyamines there may be mentioned, for example, cyclohexanediamine. Suitable polyamines belonging to the group of aromatic polyamines include, for example, phenylenediamine, toluenediamine, diaminodiphenylamine, N,N'-diphenyl-propylenediamine, stilbendiamine and so on.

The term "phenol" is employed herein to mean a compound formed by substituting at least one hydroxy group for a hydrogen atom in a benzene ring. That is, the phenol employed in the process according to the present invention includes phenol itself, naphthol, cresol and polyphenols, such as catechol, resorcinol, hydroquinone, pyrogallol and the like.

The proportions of the raw materials for obtaining the ternary product may be appropriately changed in view of general tendencies of the ternary product which are stated below. In general, when the amount of furfural is increased, the ternary product is liable to form a tenacious film and to adhere firmly to the inner surface of the vessel. However, when the amount of furfural is too great, the ternary product is deteriorated with respect to the property of preventing the scale adhesion. Conversely, if the amount of the furfural is too little, the ternary product is liable to form a brittle film and to be peeled off from the surface.

As for polyamine, the amount thereof can be widely varied according to the specific polyamine that is actually used. Generally, when the polyamine is used in a large amount, the ternary product has an improved property of preventing the scale adhesion. However, when too much polyamine is used, the ternary product is liable to form a brittle film and cause the polymerization reaction to be retarded or the resulting polymer to be colored. Conversely, when the amount of polyamine is too little, the ternary product is liable to deteriorate with respect to the property of preventing the scale adhesion.

As for the phenol, if a relatively large amount is used, the ternary product is liable to have a strong adhering property. However, if the amount of the phenol is too great, the ternary product is deteriorated with respect to the property of preventing scale adhesion, and also tends to retard the polymerization reaction. Conversely, if the amount of the phenol is decreased, the ternary product is liable to have a low adhering power and also be deteriorated with respect to the property of preventing scale adhesion. Taking into consideration these general tendencies of the ternary product, furfural, polyamine and phenol are each preferably mixed in a proportion within the range of approximately from 5 to 90 mol% of the ternary product.

Catalysts, such as an acid or alkali, are sometimes used in the process for preparing the ternary product, but they are not always necessary. It is better not to use a catalyst if it is possible to prepare the ternary product without it. Known catalysers which have been used for reacting phenol with furfural or with a wide variety of aldehydes can be used.

The ternary product can vary widely in its properties. For example, it may range from a solid to a viscous liquid according to the condition under which it is produced. Especially, the ternary product varies in its solubility in a solvent. In general, when the ternary product is prepared by carrying out the reaction under mild conditions, the ternary product is soluble in solvents such as acetone, ethanol, water and so on. However, when the ternary product is prepared by a reaction carried out at high temperatures or for many hours, the ternary product tends to be insoluble in these solvents. Some ternary products may be soluble in water, when the water is acidic or alkaline. However, there is no problem since the ternary product can be dissolved in a solvent because, when the ternary product can be dissolved in some solvent, it can be applied to the inner surface of the polymerization vessel or it can be dispersed in the solvent and added into a polymerization system.

As for the order in which the reactions are carried out for preparing the ternary product, it can be varied. For example, the furfural may first be reacted with the polyamine and then the resulting product reacted with the phenol. Or the furfural may first be reacted with the phenol and then the resulting product reacted with the polyamine. The differences caused by varying the order of the reaction will be explained below, taking the case wherein phenol itself is used as the phenol and m-phenylenediamine is used as the polyamine and a case wherein ethylenediamine is used as the polyamine.

The first explanation is of the case wherein m-phenylenediamine is used as the polyamine, particularly wherein furfural is at first reacted with m-phenylenediamine and then the resulting product is reacted with phenol. In this case, the first reaction, that is, the reaction of furfural with m-phenylenediamine can be carried out simply by mixing them. In order to react the resulting product with phenol, it is necessary to add hydrochloric acid as a catalyst and to heat the reaction mixture, for example, at 120°–250° C. for 5–60 minutes. Thus, a suitable ternary product can be obtained. The ternary product can be dissolved in an aqueous solution acidified by hydrochloric acid.

The next explanation is of the case wherein furfural is first reacted with phenol and then the resulting reaction product is reacted with m-phenylenediamine. In the first reaction, phenol is heated at about 135° C. to become molten and, at this temperature, sodium hydroxide is added and dissolved therein. Thereafter, furfural is gradually added thereto and, when further heated, the furfural reacts easily with the phenol to form a reaction product. To the reaction product is added m-phenylenediamine to form a mixture which is heated at 120°–250° C. for 60–180 minutes to obtain the ternary product. The ternary product can be dissolved in an alkaline solution such as sodium hydroxide. When the m-phenylenediamine is reacted with the reaction product obtained in the first reaction, hydrochloric acid may be used as a catalyst for the reaction and the ternary product thus obtained is soluble in an ethanol solution of caustic soda.

The following explanation is of the case in which ethylenediamine is used as the polyamine, and particularly of the case wherein furfural is reacted with ethylenediamine in the first step and thereafter phenol is reacted with the resulting product in the second step. The first step reaction can be carried out simply by dropping furfural gradually into ethylenediamine. In this case, heat is generated when the furfural is dropped into the ethylenediamine and thus the reaction product is obtained. Phenol is added to the reaction product and hydrochloride acid is further added as a catalyst. The resulting mixture is heated at 120°–180° C. for 15–60 minutes to obtain a ternary product. The ternary product is soluble in an aqueous solution acidified by acetic acid.

Furthermore, an explanation is made of the case in which furfural is reacted with phenol in the first step and, thereafter, the resulting reaction product is reacted with ethylenediamine in the second step. As mentioned above, the reaction product of furfural with phenol can be easily obtained by the addition of sodium hydroxide. To the reaction product is added ethylenediamine to form a mixture which is then heated at 140°–180° C. for 60 minutes to obtain the ternary product. The ternary product is soluble in an aqueous alkaline solution such as caustic soda.

In the process of this invention, the ternary product is applied to the inside of a polymerization vessel or added to a polymerization system. When applied to the inside of the polymerization vessel, the ternary product is dissolved in an appropriate solvent to form a solution which is then applied. The application can be made in any convenient manner, such as brushing, spraying and the like. If oil or water or the like is adhered to the surface before the application, it is preferable to clean the surface before applying the ternary product to the surface. Further, when the ternary product is to be added to the polymerization system, the ternary product is dissolved or dispersed in an appropriate solvent or dispersion medium to form a solution or dispersion which is then added to the polymerization system.

The portion of the polymerization vessel to which the ternary product is to be applied is not limited to the inner surface. When the polymerization vessel is provided with obstacle plates, a stirrer and the like, the ternary product may be applied on the surface of these. Moreover, when the stirrer is provided with blades, the ternary product should be applied on the blades. Furthermore, when the polymerization vessel is provided with a thermometer and so on which are pendent therein, the ternary product should be applied on the surfaces of the thermometer and so on. In short, the ternary product should be applied to all of the surfaces to which the scale is liable to adhere.

The ternary product should preferably be applied in an amount of 0.0001 g/m$^2$ to 5 g/m$^2$ on the basis of the amount of the ternary product itself. More preferably, the amount is between 0.001 g/m$^2$ and 0.5 g/m$^2$. When the amount of the ternary product applied is too small, the effect of preventing the scale adhesion is not sufficiently achieved while, then the amount of the ternary product applied is too large, the ternary product causes not only the polymerization product to be colored or the polymerization reaction to be delayed, but also is liable to be peeled off and mixed in the final product.

When the ternary product is to be added to the polymerization system, the ternary product itself is preferably added so as to be present in an amount of between 0.05 and 50 parts by weight per million parts of vinyl chloride monomer. Especially, 0.1–10 ppm by weight is most preferable. If the added amount is outside the range of 0.05–50 ppm, the disadvantages which are mentioned above with respect to the application of the product are liable to occur.

In the case of applying the ternary product to the polymerization vessel, after the solvent has been completely evaporated, raw materials for polymerization are charged into the polymerization vessel. Additionally, before the raw materials are charged, it is preferable to wash the polymerization vessel with water or to fill the polymerization vessel with water to remove the water-soluble ingredients present in the applied ternary product or to remove the ternary product film which is liable to be peeled off and, thereafter, to charge the raw materials for polymerization.

In the process of this invention, the ternary product may be applied and further may also be added. As mentioned above, the addition is normally carried out by dissolving or dispersing the ternary product in an appropriate solvent or dispersion medium and, in this case, an aqueous medium is preferably used as the solvent or the dispersion medium. Also, the addition is preferably carried out by flowing the ternary product solution or dispersion onto the inner surface of a polymerization vessel.

The method according to this invention is effective not only in the case wherein vinyl chloride alone is polymerized, but also in the case wherein vinyl chloride is copolymerized with other monomers. The method is also effective in the case where vinyl chloride is graft-polymerized with other polymers or copolymers. The said other monomers are, for example, ethylene, propylene, vinyl acetate, vinylidene chloride and so on. The said other polymers are, for example, polyvinyl acetate, polystyrene and the like. The said copolymers include, for example, vinyl acetate-ethylene copolymer.

In the method of this invention, known oil-soluble polymerization initiators can be used in the same manner as they are used in a conventional suspension polymerization process. Examples of the polymerization initiators are peroxides, such as benzoylperoxide, lauroylperoxide, diisopropyl peroxydicarbonate and azo-compounds, such as 2,2'-azobis-2,4-dimethyl valeronitrile and 2,2'-azobisbutyronitrile.

It is a common practice to use dispersing agents when a suspension polymerization is carried out and, in the present invention, known dispersing agents can be used in a conventional manner. Suitable dispersing agents are, for example, partially saponified polyvinyl acetate, cellulosic derivatives, starch, gelatin and the like.

When the ternary product is to be applied, it is applied to the inner surface of the polymerization vessel as mentioned above. Then the aqueous medium is poured into the vessel, the dispersion medium is added thereto and vinyl chloride monomer and oil-soluble polymerization initiating agents are further added. Thereafter, suspension polymerization is carried out according to a conventional manner. When it is to be added, the ternary product is added to the polymerization system, including aqueous medium, vinyl chloride monomer and polymerization initiator and then suspension polymerization is carried out in a conventional manner. In this manner, scale is scarcely produced or adhered to the inner surface of the polymerization vessel or to the surface of a stirrer or the like. If scale adheres to the surfaces in a small amount, it can be easily removed with water. In the conventional process wherein scale adheres to the vessel, it is still difficult to remove the scale even by means of high pressure water of more than 100 kg/cm² gauge. However, according to the method of this invention, the scale can be removed without difficulty by means of water under a pressure as low as 30 kg/cm² gauge.

Moreover, when the ternary product is once applied to the inner surface of the polymerization vessel according to the method of this invention, the polymerization vessel can be used several times in a batch process without reapplying the ternary product. Particularly, even in the case wherein the ternary product is applied to the inner surface of the vessel for the first time, suspension polymerization can be carried out in the vessel four or five times continuously in a batch process. In a vessel to which the ternary product was thus applied repeatedly, the effect will last to such a degree that an application is not needed until the vessel is used for carrying out the polymerization continuously more than 10 times by a batch process. It is to be understood that the ternary product should be added in every batch in the case where the ternary product is added to the polymerization system.

By way of examples, the process in the invention will be explained further. However, the examples do not limit the invention in any way.

EXAMPLE 1

In this example, phenol itself was used and m-phenylenediamine was used as the polyamine. A ternary product was prepared by reacting, initially, the phenol with furfural and then by reacting the resulting reaction product with the m-phenylenediamine. The resultant ternary product was used in this example.

(a) The ternary product was produced in the following manner: Firstly, 3 gram mol of phenol was placed in a 3 liter separable flask which is made of glass and equipped with a stirrer, 0.3 gram mol of caustic soda was added thereto to form a mixture, which was heated at 135° C. to dissolve the caustic soda in the phenol. Then 3 gram mol of furfural was gradually added to the mixture and reacted with the phenol for 3 hours while maintaining the above temperature. Thereafter, 6 gram mol of m-phenylenediamine was added thereto, reacted for 1.5 hours at 170° C. and cooled to obtain a dark brown solid. The solid was the ternary product, which was dissolved in 0.04% by weight caustic soda aqueous solution to obtain a 1% by weight ternary product solution.

(b) Vinyl chloride was polymerized by use of the ternary product solution in the manner mentioned below.

In a polymerization vessel (having a capacity of 24.5 liters) made of stainless steel, from which scale had been completely removed, the inner surface of the vessel was halved in the annular direction and said ternary product solution was applied to only one of the halves so as to form a solid film of 0.1 g/m² on the surface. The halves were compared.

Into the vessel, 7.7 kg of pure water, 8 g of partially saponified polyvinyl acetate and 3 g of lauroylperoxide were placed. The pressure within the vessel was reduced to 40 mm Hg, and thereafter 4.4 kg of vinyl chloride monomer and subsequently 0.23 kg of ethylene monomer were charged. Thereafter, the temperature was raised to 65° C. and was maintained for 7 hours to carry out the polymerization. The polymerization could be advanced as usual. Thereafter, the polymerization slurry was removed from the polymerization vessel, which was then washed with water at a normal pressure. The polymer thus obtained was not different from the polymers heretofore in use.

After washing, the inner surface of the polymerization vessel was inspected to observe how much scale had adhered. It was found that, on the surface to which the ternary product had been applied, the applied film of the ternary product had neither peeled off nor disappeared from the surface and scale had scarcely been formed on the surface. On the other hand, it was found that on the surface to which the ternary product had not been applied, scale was formed in such a large amount that the surface could hardly be seen.

EXAMPLE 2

In this example, phenol itself was used and ethylenediamine was used as the polyamine. The ternary product used herein was prepared by at first reacting the ethylenediamine with furfural, and then reacting the resultant product with phenol.

(a) Preparation of the ternary product is explained below.

In a 1 liter separable flask of glass provided with a stirrer and a reflux condenser, 3 gram mol of ethylenediamine was placed and, while maintaining the diamine at 70° C., 3 gram mol of furfural was gradually added in 1 hour. A pale brown viscous liquid was obtained. On the other hand, 3 gram mol of phenol was placed in another 3 liter separable flask of glass provided with a stirrer and a reflux condenser, 0.3 gram mol of caustic soda was added thereto and then all of the said viscous liquid from the first flask was added thereto. Thereafter, this reaction vessel was heated to 120° C., which temperature was maintained for 60 minutes. As a result, a black viscous liquid was obtained which was the ternary product. The ternary product was dissolved in acetone to prepare a 1% by weight ternary product solution.

(b) Using the said ternary product, vinyl chloride was polymerized as follows. In a polymerization vessel (having a capacity of 25.5 liters) of stainless steel, from which scale had been completely removed, the inner surface of the vessel was halved in the annular direction and the said ternary product solution was applied to only one half so as to form a solid film of 0.01 g/m² on the surface. The other half surface of the vessel was not treated with the ternary product.

In the vessel, 12 kg of pure water, 8.6 g of partially saponified polyvinyl acetate and 3.7 g of di(2-ethylhexyl) peroxydicarbonate were placed and the air was discharged out of the vessel under reduced pressure until the pressure became 40 mmHg. Thereafter, 8.6 kg of vinyl chloride monomer was charged. The temperature was maintained at 57° C. and the polymerization was carried out for 8 hours. The polymerization could be advanced as usual. Thereafter, the polymer slurry was removed from the vessel, the inside of which was washed with water at a normal pressure. The polymer thus obtained did not differ from conventional polymers. After washing, the inner surface of the vessel was inspected to observe the state of the scale adhering thereto. Scale adhesion could hardly be seen on the inner surface to which the ternary product was applied. However, on the surface to which the ternary product was not applied, there was observed so much scale that the surface of the reactor could hardly be seen. In addition, it was found that the film of the ternary product was slightly decreased in thickness.

EXAMPLE 3

In this example, the dark brown solid obtained in Example 1(a) was used as the ternary product. The solid was dissolved in acetone to form a 0.1% by weight acetone solution, which was used for application.

The inner surface of a polymerization vessel, from which scale had been completely removed, was divided into four equal parts in the annular direction. On each of three of the parts, said acetone solution was applied in a different amount and the remaining one was left untreated. In said three parts, the solution was applied in such amounts to form a ternary product film of 0.0001 g/m$^2$, 0.001 g/m$^2$ and 0.01 g/m$^2$, respectively. In the polymerization vessel, 12 kg of pure water, 8.6 g of partially saponified polyvinyl acetate and 3.7 g of di(2-ethylhexyl) peroxydicarbonate were placed and the air was discharged out of the vessel under reduced pressure until the pressure was reduced to 40 mmHg. Thereafter, 8.6 kg of vinyl chloride monomer was charged. The vinyl chloride was polymerized at 57° C. for 8 hours. The polymerization could be advanced as usual. Thereafter the polymer slurry was discharged and the vessel was washed with water at a normal pressure. The polymer thus obtained was not different from ones heretofore available.

After washing, the inner surface of the polymerization vessel was inspected to observe the state of the scale adhering thereto. There was observed a very few adhering scale on the parts to which the ternary product had been applied in films of 0.001 g/m$^2$ and 0.01 g/m$^2$, respectively. However, on the part to which the ternary product was applied in a film of 0.0001 g/m$^2$, there was observed a few scale, but the scale was observed to be of several times quantity compared with the said very few adhering scale, and on the part to which the ternary product was not applied, there was observed scale adhering in such a large amount that the surface of the reactor could hardly be seen. Then water under a pressure of 30 kg/cm$^2$ gauge was sprayed against the scale to wash it off. All of the scale could be removed without difficulty from the surfaces to which the ternary product had been applied. However, the scale on the part to which the ternary product was not applied could be only partly removed and could not be completely removed.

EXAMPLE 4

In this example, the dark brown solid obtained in (a) of Example 1 was used as the ternary product and converted into a 1% by weight aqueous caustic soda solution in the same manner as in Example 1.

In a polymerization vessel (having a capacity of 25.5 liters) of stainless steel from which the scale had been completely removed, 2.58 g of said solution, 12 kg of pure water, 8.6 g of partially saponified polyvinyl acetate and 3.7 g of di(2-ethylhexyl) peroxydicarbonate were placed. Then the air was discharged out of the vessel under reduced pressure until it became 40 mmHg and, thereafter, 8.6 kg of vinyl chloride monomer was charged. Subsequently, the temperature was raised to 57° C., at which temperature polymerization of the vinyl chloride was carried out for 8 hours. The polymerization could be advanced as usual. Thereafter a polymer slurry was removed from the vessel and the inside of the vessel was washed with water at a normal pressure. The polymer thus obtained was not different from those available heretofore.

After washing, the inner surface of the vessel was inspected. As a result, very few adhering scale was found to be adhering to the surface which was in contact with the liquid phase. Particularly, the amount of the scale was as little as that on the parts in Example 3, on which the ternary product was formed in the film of 0.001 g/m$^2$ and 0.01 g/m$^2$. However, a little amount of scale was observed on the surface which was in contact with the gas phase.

EXAMPLES 5-7

In these examples, vinyl chloride was polymerized in the same manner as in Example 4, except that the aqueous caustic soda solution of the ternary product was added in respective amounts different from that employed in Example 4. Particularly, the amount in Example 5 was 10 ppm by weight on the basis of vinyl chloride monomer; the amount in Example 6 was 1 ppm by weight; and the amount in Example 7 was 0.05 ppm by weight. The polymerization in each example could be advanced as usual. After the polymerization in Example 5, it was found that the polymer slurry was colored in pale brown but no scale was adhered. In Example 6 it was found that neither the polymer slurry was colored nor was scale adhered to the vessel. In Example 7 the polymer slurry was not colored but scale was adhering to the vessel in a small amount.

When these results were totally considered, the following relationships were found: In the case wherein the ternary product in Example 1 was used and added in the form of a caustic soda solution in an amount of more than 0.05 ppm by weight of vinyl chloride, an effect of preventing scale adhesion could be brought about and the polymerization could be advanced as usual. However, in the case wherein the ternary product was added in an amount of more than 10 ppm by weight, the polymer slurry was colored. Consequently, it can be said that a suitable amount of the ternary product to be added is within the range of 0.05-10 ppm by weight of vinyl chloride.

EXAMPLE 8

In this example, resorcinol was used as the phenol and m-phenylenediamine as the polyamine. The ternary product was prepared by initially reacting the resorcinol with furfural and then reacting the resultant product with the m-phenylenediamine.

(a) The preparation of the ternary product is explained hereinbelow.

10 g of resorcinol was placed in an eggplant typed flask having a capacity of 200 ml. 0.1 g of caustic soda was added thereto, 10 g of furfural was further added and the resulting mixture was heated at 135° C. to cause the resorcinol to react with the furfural. After continuing the reaction for 10 minutes, 10 g of m-phenylenediamine was added thereto and reacted at 170° for 10 minutes and the reaction mixture was thereafter cooled to obtain a dark brown solid. The solid was the ternary product. It was dissolved in a 0.1% by weight aqueous nitric acid solution to obtain a 1% by weight ternary product solution.

(b) Using the said ternary product solution, vinyl chloride was then polymerized in the same manner as in Example 1. The resultant polymer slurry was removed from the polymerization vessel and the vessel was then washed with water at a normal pressure. The polymer thus obtained was not different from polymers available heretofore. After washing, the inner surface of the vessel was inspected to observe the state of any adhering scale. As a result, on the surface to which the ternary product had been applied, a scarce amount of scale was found to adhere. In contrast, on the surface to which no ternary product had been applied, the scale was found to adhere in such large amounts that the surface itself could hardly be seen.

What is claimed:

1. In a process for suspension polymerizing vinyl chloride in which vinyl chloride or a mixture of vinyl chloride and a monomer or polymer copolymerizable therewith is dispersed in an aqueous medium in a polymerization vessel and polymerized in suspension in the presence of an oil-soluble polymerization initiator, the improvement which comprises applying a ternary reaction product of: (a) furfural; (b) a polyamine selected from the group consisting of ethylenediamine, a propylenediamine, trimethylenediamine, tetramethylenediamine, pentamethylenediamine, hexamethylenediamine, diethylenetriamine, tetraethylenepentamine, polyethyleneimine, cyclohexanediamine, phenylenediamine, toluenediamine, diaminophenylamine, N,N'-diphenylpropylenediamine and stilbendiamine; and (c) a phenol, the phenol being a benzene ring having at least one hydrogen atom on the benzene ring replaced by a hydroxy group, to the inner surfaces of the polymerization vessel in an amount of 0.0001 $g/m^2$ to 5 $g/m^2$ or adding the ternary reaction product to the polymerization system in an amount of between 0.05 and 50 parts by weight per million parts of vinyl chloride monomer, whereby the formation of scale on the inner surfaces of the polymerization vessel is inhibited.

2. The process of claim 1 wherein the phenol, polyamine and furfural, are each employed in an amount of 5 to 90 mol % of the ternary reaction product.

3. The process of claim 1 in which the phenol is a member selected from the group consisting of phenol, napthol, cresol, catechol, resorcinol, hydroquinone and pyrogallol.

4. The process of claim 1 wherein the ternary reaction product is applied in an amount of 0.001 $g/m^2$ to 0.5 $g/m^2$.

5. The process of claim 1 wherein the ternary reaction product is added to the polymerization system in an amount of 0.1 to 10 parts by weight per million parts of vinyl chloride monomer.

* * * * *